Nov. 6, 1934.　　　　N. B. THOMPSON　　　　1,980,015
VEHICLE TRAILER CONSTRUCTION
Filed July 28, 1934　　2 Sheets-Sheet 1
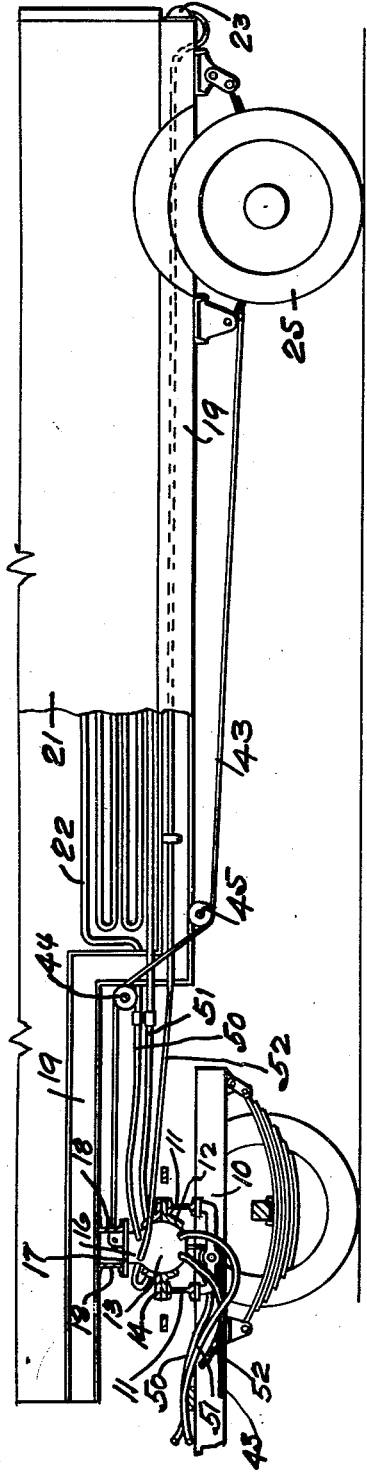
INVENTOR
NEWTON B. THOMPSON
by J. H. Weatherford
Atty.

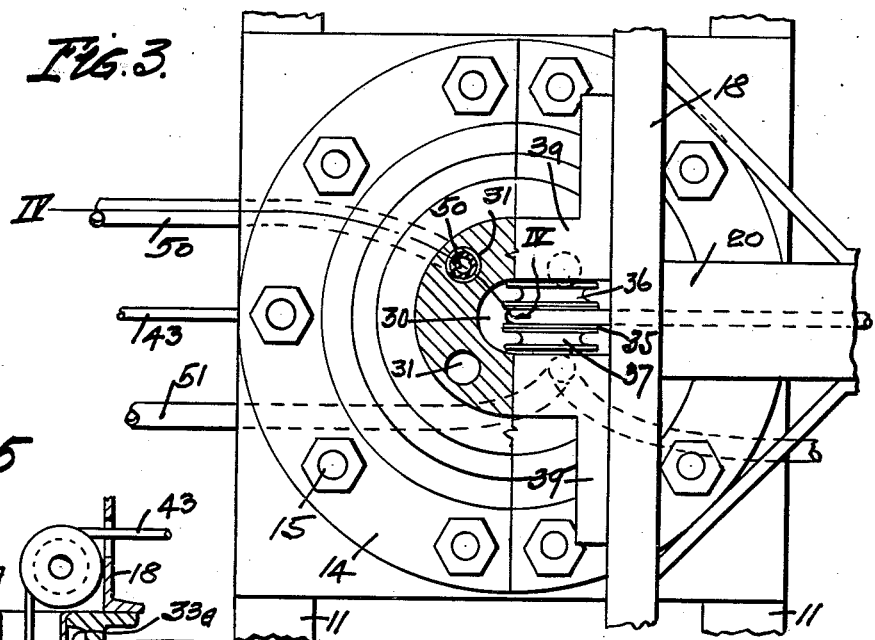
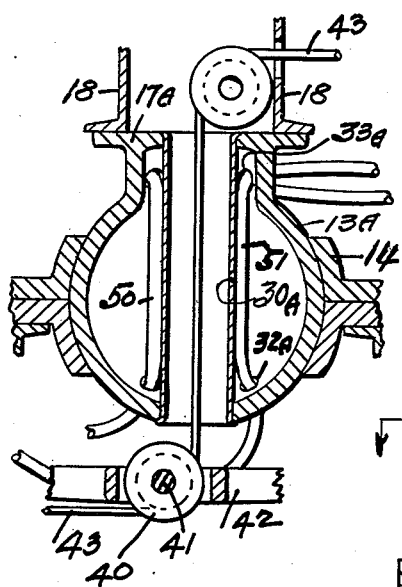
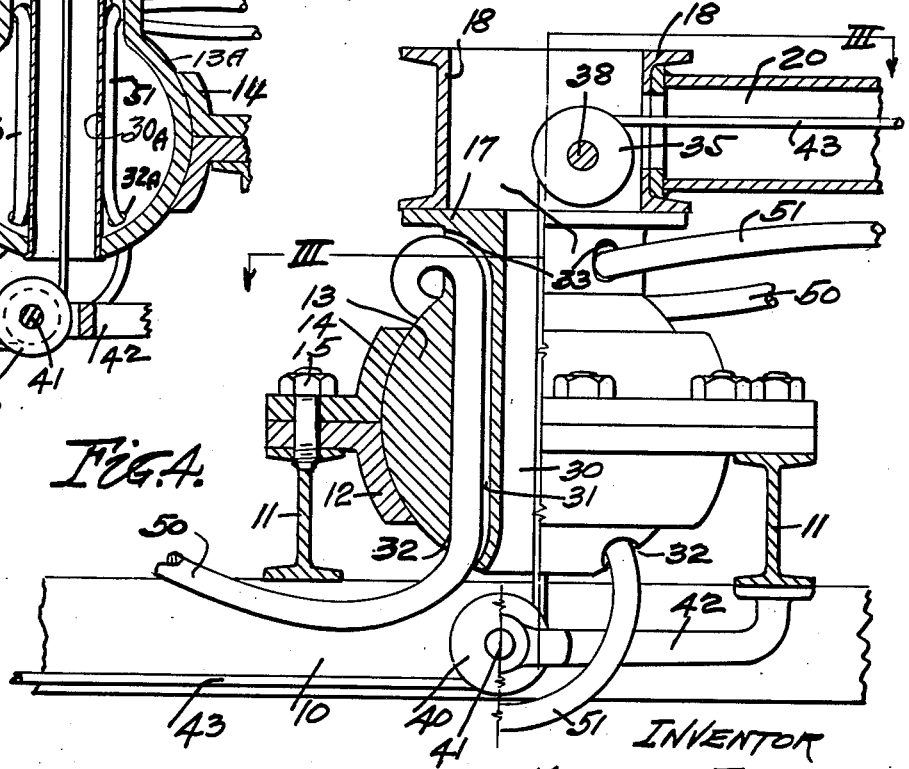

Patented Nov. 6, 1934

1,980,015

UNITED STATES PATENT OFFICE 1,980,015

VEHICLE TRAILER CONSTRUCTION

Newton B. Thompson, Wilson, Ark.

Application July 28, 1934, Serial No. 737,321

4 Claims. (Cl. 280—33.1)

This invention relates to improvements in vehicle trailer construction, and particularly to a universal connection between the tractor portion of such a construction and the trailer portion thereof, and means for efficiently accomplishing the connection of service devices on such tractor portion to the trailer portion thereof.

In tractor drawn trailers, service devices, such as means for putting on the brakes, means for heating and/or cooling the trailer, means for lighting the trailer, and means as for dumping trailer bodies are used in various combinations, all in many cases operated directly from the tractor. The connecting wiring, pipes and/or cables in such cases often sag down and are stripped off by obstructions otherwise cleared by both tractor and trailer, and, especially in cable operated brakes, are subject to slackening and/or loosening, rendering the braking service inefficient and undependable.

The objects of the present construction are:

To provide a universal hitch between a tractor and trailer;

To provide in a universal hitch construction for a tractor-trailer, means for efficiently accomplishing the connection of service means on the tractor with the like service means on the trailer;

To provide in such a tractor-trailer construction, means for connecting service cables on such tractor with the like service cables on such trailer;

To provide in such a tractor-trailer construction, means for connecting service pipes on such tractor with the like service pipes on such trailer;

To provide in such a tractor-trailer construction, means for connecting service wiring on such tractor with the like wiring on the trailer;

To provide more efficient means for applying the brakes on such trailer through the cables leading thereto;

And to generally improve the design and construction of such devices.

The means by which the foregoing and other objects are accomplished, and the manner of their accomplishment will readily be understood from the following specification on reference to the accompanying drawings, in which,—

Fig. 1 is a sectional side elevation showing the universal connection between a tractor and trailer and typical service connections therefrom and thereto respectively.

Fig. 2 is an enlarged sectional elevation showing detail of the preferred form of trailer-brake hook-up.

Fig. 3 is a sectional plan taken as on the broken line III—III of Fig. 4.

Fig. 4 is a side view, one-half in section on the line IV—IV of Fig. 3, and

Fig. 5 is a sectional elevation on a somewhat smaller scale than Figs. 3 and 4, showing a modification of the ball construction.

Referring now to the drawings in which the various parts are referred to by numerals; 10 indicates the rear end of the frame of a tractor or other vehicle. 11 are transverse beams supported by the frame 10. These beams carry a socket member 12 in which a ball 13 is seated. 14 is an annular cap which holds the ball in place. This cap as will be seen from Fig. 3 is in halves and is secured to the member 12 as by cap screws or bolts 15. The ball 13 preferably has a short neck portion 16 which terminates in a seat 17 which supports, and is suitably secured to, transverse trailer frame members 18 which in turn support and are secured to the trailer body members 19; or these transverse members 18 may be secured to a reach pole 20 as shown in Figs. 3 and 4.

21 indicates a trailer body to be heated or cooled as by a coil 22. 23 indicates a tail light and is intended as typifying any lights carried by the trailer, or any other electrical apparatus thereon to which current is to be furnished from the tractor.

25 are trailer wheels, 26 the axle, and 27 a usual type of brake.

The ball 13 has a central opening 30 extending vertically upward therethrough and through the neck 16 and seat 17, and a plurality of other openings 31, disposed around the central opening and parallel therewith. These latter openings curve laterally outward at 32, adjacent the bottom of the ball, and at 33 adjacent the top of the ball but below the seat 17.

Or as shown in Fig. 5 the ball 13A may be hollow. In such case the central opening preferably is separated from the remaining hollow portion of the ball by a tube 30A which extends through the seat 17A and the bottom of the ball. Lateral outlets 32A and 33A are provided in pairs as before. In this construction the tube 30A may be omitted if desired.

Disposed above the opening 30 in the ball, is a grooved pulley 35, the groove being so disposed that the axis of the hole is tangent to the center of the groove. Preferably also, the pulley 35 is flanked on both sides by additional grooved pulleys 36, 37. These pulleys are journaled on a shaft 38, which is carried by brackets 39 secured to the trailer frame members 18.

Below the opening 30, in the ball, a pulley 40 or pulleys corresponding to the pulley 35, or the pulleys 35, 36, 37, as the case may be is/are journaled on a pin 41, which is carried by a bracket 42, secured to the beams 11, or other portion of the tractor frame. 43 is a brake cable leading from any usual actuating mechanism on the tractor, which being well known, is not shown, under the pulley 40, thence upward through the hole 30, over the pulley 35 and rearward to the mechanism of the brake 27. If desired change in direction of the cable 43, may be accomplished as by pulleys 44, 45 on the trailer frame members 19. Additional service cables not shown may be similarly disposed over the pulley 36, 37 and the complementary lower pulleys.

50—51 indicate flexible tubes or hose which lead from the tractor to the ball 13 and thence upward each through a hole 31 and thence to the coil 32 in the trailer, or to such other part of the trailer or device thereon as may require servicing with a supply of liquid or gas.

While two such tubes only are shown, obviously four may be used with the ball structure delineated or even more might be provided for. However, dissimilar service facilities such as wiring 52 for the tail light 23 or other electrical devices will preferably utilize at least one of the other holes.

It will be particularly noted that the tubes 50, 51 and the wiring 52 each have a loop portion immediately adjacent the lower portion of the ball providing for turning or other motion of the ball and that the total motion being extremely limited such loops are minor in extent. In this construction also those devices such as tubes and wiring which have no movement relative to the ball are separated from those service devices such as the brake cable 43 which have longitudinal movement therethrough. It will be obvious that the cable 43 is properly centered at the top of the ball, but that there is a limited movement of the cable with respect to the lower end of the hole through the ball. Longitudinally this movement is extremely limited, laterally there is more motion, and to care for such motion the pulley 40 may be allowed to shift along the pin 41.

The brake cable 43 extends rearwardly to one arm 60 of a bell crank lever pivotally carried by a bracket 61 mounted on the rear axle. The other arm 62 of the bell crank lever is connected by a link 63 with the usual equalizing bar 64 through which the pull is transmitted to the brake levers 65. With such a hookup, the brakes are seated with a long stroke and are then set up to apply the brake with a short powerful toggle movement.

In use the tractor and trailer are coupled by the ball and socket joint, and flexible tubes for transmission of fluid from tractor to trailer, service wiring and cables are connected up from the tractor to the trailer, only such slack being allowed in the tubes and wires as is necessary for the limited movement of the ball. All of such devices being otherwise supported to substantially eliminate sag.

What I claim is:

1. In combination a tractor and a trailer, coupling means therefor, including an annular socket carried by said tractor, a complementary annular cap and securing means for said cap, a ball secured to and depending from said trailer, seated in said socket and retained by said cap, said ball having a vertically disposed central opening and a plurality of segregated openings therearound, all of said openings originating below said socket and terminating above said cap, a plurality of service devices on said trailer, and a plurality of servicing devices leading from said tractor upward through said ball openings and along said trailer to said service devices.

2. In combination a tractor and a trailer, coupling means therefor, including an annular socket carried by said tractor, a complementary annular cap and securing means for said cap, a hollow ball secured to and depending from said trailer, seated in said socket and retained by said cap, said ball having through the bottom portion thereof, a central opening and a plurality of segregated openings therearound, all of said openings originating below said socket, said ball having in the top portion thereof corresponding openings all terminating above said cap, a plurality of service devices on said trailer, and a plurality of servicing devices leading from said tractor into said ball through said bottom openings, and from said ball through said top openings and along said trailer to said service devices.

3. In combination a tractor and a trailer, coupling means therefor, including an annular socket carried by said tractor, a complementary annular cap and securing means for said cap, a hollow ball secured to and depending from said trailer, seated in said socket and retained by said cap, said ball having through its bottom portion, a central opening and a plurality of segregated openings therearound, all of said openings originating below said socket, said ball having in the top portion thereof corresponding openings, all terminating above said cap, and a tube connecting said top and bottom central openings, segregating a central passageway through said ball, a plurality of service devices on said trailer, and a plurality of servicing devices leading from said tractor upward through said ball openings and along said trailer to said service devices.

4. In combination a tractor and a trailer, coupling means therefor, including an annular socket carried by said tractor, a complementary annular cap and securing means for said cap, a ball secured to and depending from said trailer, seated in said socket and retained by said cap, said ball having a vertically disposed central opening and a plurality of segregated openings therearound, all of said openings originating below said socket and terminating above said cap, a plurality of service devices on said trailer, and a plurality of servicing devices leading from said tractor upward through said ball openings and along said trailer to said service devices, at least one of said service devices being dissimilar from the others thereof, the servicing device therefor leading through said central opening.

NEWTON B. THOMPSON.